(12) United States Patent
Güclü et al.

(10) Patent No.: US 11,255,414 B2
(45) Date of Patent: Feb. 22, 2022

(54) TENSIONER

(71) Applicant: GATES CORPORATION, Denver, CO (US)

(72) Inventors: Ahmet Güclü, Izmir (TR); Erman Demir, Izmir (TR); Sarp Cankul, Izmir (TR); Senol Yildiz, Izmir (TR); Riza Kula, Izmir (TR)

(73) Assignee: Gates Corporation, Denver, CO (US)

( * ) Notice: Subject to any disclaimer, the term of this patent is extended or adjusted under 35 U.S.C. 154(b) by 308 days.

(21) Appl. No.: 16/413,073

(22) Filed: May 15, 2019

(65) Prior Publication Data

US 2020/0362945 A1 Nov. 19, 2020

(51) Int. Cl.
*F16H 7/12* (2006.01)
*F16H 7/08* (2006.01)

(52) U.S. Cl.
CPC ...... *F16H 7/1281* (2013.01); *F16H 2007/081* (2013.01); *F16H 2007/0844* (2013.01); *F16H 2007/0865* (2013.01); *F16H 2007/0893* (2013.01)

(58) Field of Classification Search
CPC ............. F16H 7/1281; F16H 2007/081; F16H 2007/0878; F16H 2007/0844; F16H 2007/0865; F16H 2007/0893
USPC .................................................. 474/135, 112
See application file for complete search history.

(56) References Cited

U.S. PATENT DOCUMENTS

| | | | | |
|---|---|---|---|---|
| 4,832,665 A * | 5/1989 | Kadota | .................. | F16H 7/1227 474/112 |
| 5,266,067 A * | 11/1993 | Gapco | .................. | F16H 7/1281 474/112 |
| 5,620,385 A * | 4/1997 | Cascionale | ........... | F16H 7/1218 474/112 |
| 6,165,091 A * | 12/2000 | Dinca | ..................... | F16F 9/145 474/101 |
| 6,196,940 B1 * | 3/2001 | Lehtovaara | ............... | F16H 7/12 474/112 |
| 6,364,795 B1 * | 4/2002 | Komorowski | ........ | F16H 7/1281 474/42 |
| 6,375,588 B1 * | 4/2002 | Frankowski | .......... | F16H 7/1227 474/101 |
| 7,285,065 B2 * | 10/2007 | Dinca | ................... | F16H 7/1281 474/112 |
| 7,611,431 B2 * | 11/2009 | Dinca | ................... | F16H 7/1281 474/112 |
| 7,637,829 B2 * | 12/2009 | Stone | .................... | F16H 7/1281 474/109 |
| 7,918,755 B2 * | 4/2011 | Baumuller | ............ | F16H 7/1218 474/135 |

(Continued)

*Primary Examiner* — Henry Y Liu
(74) *Attorney, Agent, or Firm* — Alyssa K. Sandrowitz, Esq.

(57) ABSTRACT

A tensioner comprising a base having a shaft and having a radially projecting tab therefrom, a pivot arm pivotally engaged with the shaft about a pivot axis A-A, a torsion spring disposed between the base and the pivot arm, the torsion spring in a compressed state, a pulley journalled to the pivot arm, a first axial member extending from the pivot arm, the first axial member comprising a radially projecting portion adjacent to a radially receding portion, and the radially projecting portion engaging the radially projecting tab in a first pivot arm position and the radially receding portion cooperating with the radially projecting tab in a second pivot arm position.

14 Claims, 2 Drawing Sheets

(56) References Cited

U.S. PATENT DOCUMENTS

| | | | | |
|---|---|---|---|---|
| 7,980,976 B2 * | 7/2011 | Stepniak | ............... | F16H 7/1281 474/112 |
| 8,292,765 B2 * | 10/2012 | Rolando | ............... | F16H 7/1281 474/112 |
| 8,641,564 B2 * | 2/2014 | Rolando | ............... | F16H 7/1281 474/112 |
| 8,690,718 B2 * | 4/2014 | Cantatore | ............. | F16H 7/1281 474/111 |
| 8,734,279 B2 * | 5/2014 | Ward | ................... | F16H 7/1218 474/112 |
| 8,926,462 B2 * | 1/2015 | Ward | ................... | F16H 7/1281 474/112 |
| 9,239,097 B2 * | 1/2016 | Lescorail | ................. | F16H 7/12 |
| 10,753,436 B2 * | 8/2020 | Demir | ..................... | F16H 7/08 |
| 10,788,106 B2 * | 9/2020 | Hauck | ................... | F16H 7/1281 |
| 2006/0068957 A1 * | 3/2006 | Stone | ................... | F16H 7/1281 474/135 |
| 2010/0190595 A1 * | 7/2010 | Baumuller | ............ | F16H 7/1281 474/112 |

\* cited by examiner

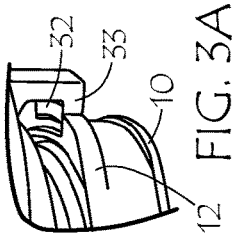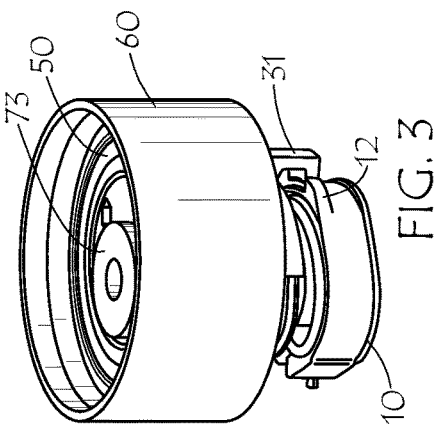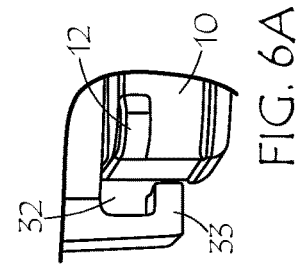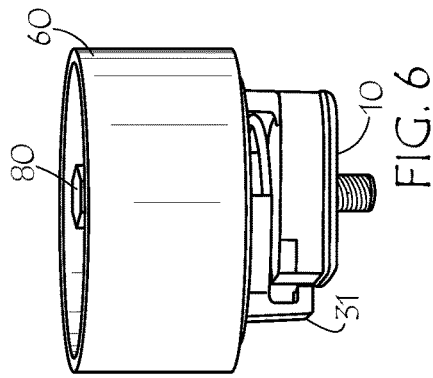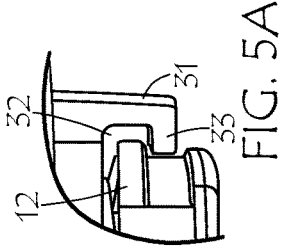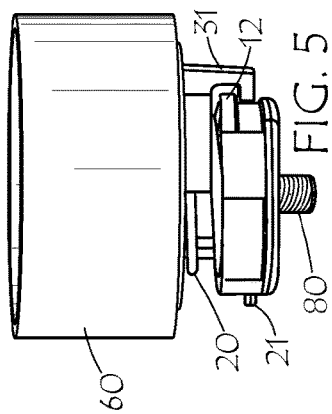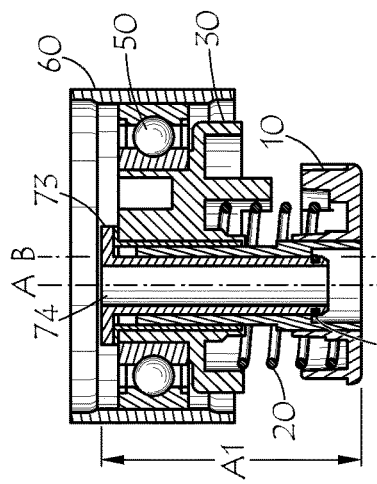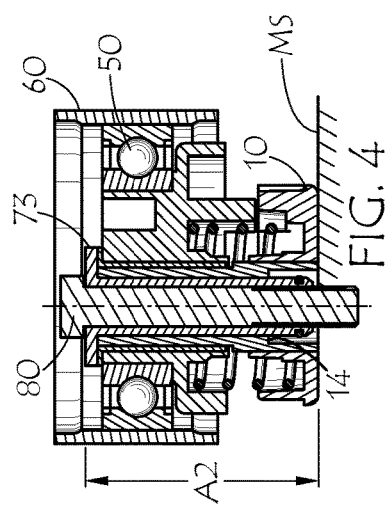

TENSIONER

FIELD OF THE INVENTION

The invention relates to a tensioner, and more particularly, to a tensioner having a first axial member extending from the pivot arm, the first axial member comprising a radially projecting portion adjacent to a radially receding portion, and the radially projecting portion engaging a radially projecting tab in a first pivot arm position and the radially receding portion cooperating with the radially projecting tab in a second pivot arm position.

BACKGROUND OF THE INVENTION

Belt tensioners are generally well known devices that have been used previously in many belt-drive systems. It is conventional practice to use a tensioner to apply a constant belt-tensioning force, which compensates for increases in belt length due to wear and other factors. A common type of conventional belt tensioner has a fixed structure and a pivoted structure eccentrically mounted on the fixed structure by means of a pivot assembly, and the pivoted structure has a belt-engaging pulley rotationally mounted on it. A coil spring surrounds the pivot assembly and has its ends connected between the fixed and pivoted structures so as to bias the pivot structure in a belt take-up direction. As the pivoted structure moves from a position of minimum belt take-up to a position of maximum belt take-up, the spring biasing force decreases. Despite this varying spring force over the range of tensioner movement, substantially constant belt tension is maintained by the tensioner.

Various techniques are currently used to properly install timing belt tensioners on engines. One of the most commonly used techniques is to construct the tensioner with an eccentric adjusting member that forms part of the fixed structure; the eccentric adjusting member is rotated around the tensioner mounting bolt and thus moves the tensioner away from the belt (to allow the belt to be routed into the drive system) or towards the belt (to apply tension in the drive system). A typical installation procedure when using the current standard design includes mounting the tensioner on the engine with the eccentric member in the extreme position away from the belt, routing the belt into the drive system, rotating the eccentric member towards the belt until the tensioner reaches the nominal operating position, and locking the tensioner with the mounting bolt.

Representative of the art is U.S. Pat. No. 7,980,976 which discloses a tensioner for tensioning a flexible drive means, such as a timing belt or chain, includes a pulley to contact the belt. The pulley is mounted on a tensioner arm and the tensioner arm can be rotated about a pivot shaft mounted to the tensioner by a spring. The axis about which the pulley rotates is spaced from the axis of the rotation of the tensioner arm with respect to the pivot shaft and the spacing of these axes of rotation results in the pulley moving through an eccentric towards or away from the belt when the tensioner arm is rotated. A stop is used to limit the range of movement of the tensioner arm between a desired range of movement defined by a free arm stop and a backstop. The position of the stop is adjustable by an installer. The angular range of movement of the tensioner arm is adjustable from a position suitable for installation of the tensioner to a position suitable for operation of the installed tensioner. In one embodiment, the movement of the stop from the installation position to the nominal operating position also compensates the spring.

What is needed is a tensioner having a first axial member extending from the pivot arm, the first axial member comprising a radially projecting portion adjacent to a radially receding portion, and the radially projecting portion engaging a radially projecting tab in a first pivot arm position and the radially receding portion cooperating with the radially projecting tab in a second pivot arm position. The present invention meets this need.

SUMMARY OF THE INVENTION

The primary aspect of the invention is to provide a tensioner having a first axial member extending from the pivot arm, the first axial member comprising a radially projecting portion adjacent to a radially receding portion, and the radially projecting portion engaging a radially projecting tab in a first pivot arm position and the radially receding portion cooperating with the radially projecting tab in a second pivot arm position.

Other aspects of the invention will be pointed out or made obvious by the following description of the invention and the accompanying drawings.

The invention is a tensioner comprising a base having a shaft and having a radially projecting tab therefrom, a pivot arm pivotally engaged with the shaft about a pivot axis A-A, a torsion spring disposed between the base and the pivot arm, the torsion spring in a compressed state, a pulley journalled to the pivot arm, a first axial member extending from the pivot arm, the first axial member comprising a radially projecting portion adjacent to a radially receding portion, and the radially projecting portion engaging the radially projecting tab in a first pivot arm position and the radially receding portion cooperating with the radially projecting tab in a second pivot arm position.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

The accompanying drawings, which are incorporated in and form a part of the specification, illustrate preferred embodiments of the present invention, and together with a description, serve to explain the principles of the invention.

FIG. 2 is a cross-section of the tensioner.
FIG. 3 is a perspective view of the tensioner.
FIG. 3A is a detail of FIG. 3.

FIG. 4 is a cross-section of the tensioner in FIG. 2.
FIG. 5 is a side view of the tensioner.
FIG. 5A is a detail of FIG. 5.
FIG. 6 is a side view of the tensioner
FIG. 6A is a detail of FIG. 6.

DETAILED DESCRIPTION OF THE PREFERRED EMBODIMENT

Figure 1:
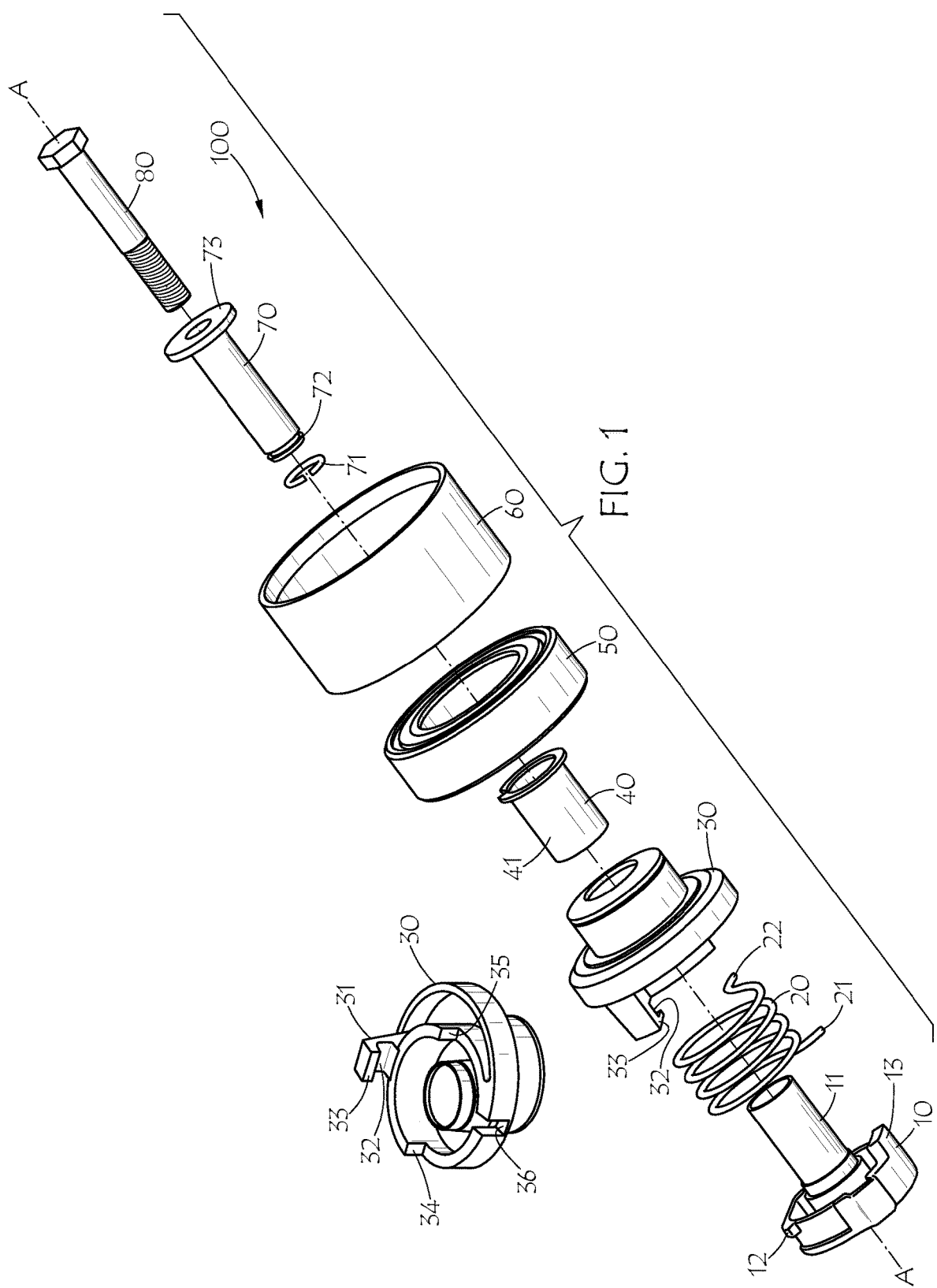
FIG. 1 in an exploded view.

FIG. 1 is an exploded view. Tensioner 100 comprises a base 10, pivot arm 30 and pulley 60.

A torsion spring 20 is disposed between base 10 and pivot arm 30. Pulley 60 is journalled to pivot arm 30 on a bearing 50. Torsion spring 20 applies a load to the pivot arm which in turn applies a load to a belt (not shown).

Bushing 40 is disposed between pivot arm 30 and base shaft 11.

Retainer 70 engages shaft 11. Retainer 70 is held in place in shaft 11 by clip 71. Clip 71 is engaged within groove 72. When clip 71 is engaged with retainer 70 pivot arm 30 is axially retrained and torsion spring 20 is compressed.

Fastener 80 is used to mount the tensioner to a mounting surface such as an engine (not shown). Fastener projects through retainer 70. During installation fastener 80 presses down on retainer flange 73, which in turn presses on pivot arm 30, thereby urging pivot arm 30 to move axially relative to base 10.

Pivot arm 30 pivots about shaft 11 on a bushing surface 41.

Base 10 comprises a tab 12 which projects radially outward from pivot axis A-A.

Pivot arm 30 comprises an axial member 31. Projecting member 31 extends in a direction parallel to the pivot axis A-A. Member 31 comprises a portion 32. Portion 32 recedes radially outward. Portion 32 is disposed to cooperatively engage with tab 12 for a part of the rotation of pivot arm 30. Member 31 further comprises projecting portion 33. Projecting portion 33 projects radially inward toward A-A. Radially projecting portion 33 is adjacent to radially receding portion 32 away from A-A on member 31.

In a first axial position of pivot arm 30, projecting portion 33 is at the same position as and adjacent to tab 12, wherein tab 12 acts as a stop for pivot arm 30 thereby preventing rotation of pivot arm 30 in a direction urged by torsion spring 20. In a second axial position of pivot arm 30, projecting portion 33 is moved out of alignment with tab 12 so that tab 12 does not act as a stop for pivot arm 30, thereby allowing pivotal movement of pivot arm 30 by action of torsion spring 20.

Base 10 comprises a base axial projection 13. Base axial projection 13 extends parallel to axis A-A. Base axial projection 13 acts as a stop to limit the range of motion of pivot arm 30 during operation. Base axial projection 13 moves between stop surface 34 and stop surface 35.

End 22 of spring 20 engages slot 36 in pivot arm 30.

FIG. 2 is a cross-section of the tensioner. Clip 71 is engaged with retainer 70. Clip 71 engages shoulder 14 within shaft 11, which prevents retainer 70 from pulling out of shaft 11 due to the force of spring 20. This in turn retains pivot arm 30 on shaft 11. Pivot arm 30 has a limited range of axial movement on shaft 11. Torsion spring 20 is in a partially compressed state with the tensioner in an assembled condition. A first dimension A1 extends from flange 73 to the bottom of base 10.

Pivot axis A-A of pivot arm 30 is offset from and parallel to the rotational axis B-B of pulley 60. Pulley 60 rotates about axis B-B on bearing 50.

FIG. 3 is a perspective view of the tensioner. Projecting portion 33 is shown adjacent to and engaged with tab 12. This configuration prevents pivot arm 30 from rotating with respect to base 10. This is referred to as the un-installed state.

FIG. 3A is a detail of FIG. 3. Projecting portion contacts or bears upon tab 12 due to the torsional spring force of torsion spring 20. This orientation restricts rotation of pivot arm 30. This is also referred to as the un-installed condition. This configuration is realized with dimension A1.

FIG. 4 is a cross-section of the tensioner in FIG. 2. Fastener 80 is engaged with hole 74 securing the tensioner to a mounting surface MS. As fastener 80 is fully installed, pivot arm 30 is pressed toward base 10, whereby dimension A2 is realized. Dimension A2 is less than dimension A1. Retainer 70 is also displaced within shaft 11 toward base 10. Fastener 80 may comprise a bolt, stud, pin or other suitable means.

FIG. 5 is a side view of the tensioner. As pivot arm in a first pivot arm position moves toward base 10, projecting portion 33 disengages from tab 12 in a second pivot arm position, thereby allowing pivot arm 30 to rotate into its installed position. Movement of the pivot arm from the first pivot arm position to the second pivot arm position is in the axial direction which is parallel to axis A-A. In the second pivot arm position alignment of receding portion 32 with tab 12 allows pivot arm 30 freedom of pivotal rotation of the pivot arm. This configuration is realized with dimension A2.

FIG. 5A is a detail of FIG. 5. Tab 12 is shown in cooperative relation to receding portion 32, which in turn allows freedom of pivotal rotation of pivot arm 30.

FIG. 6 is a side view of the tensioner. Projecting portion 33 is shown disengaged from tab 12. Pivot arm 30 is depicted in the operating position with dimension A2.

FIG. 6A is a detail of FIG. 6. Tab 12 passes through receding portion 32 during operation.

Although a form of the invention has been described herein, it will be obvious to those skilled in the art that variations may be made in the construction and relation of parts without departing from the spirit and scope of the invention described herein. Unless otherwise specifically noted, components depicted in the drawings are not drawn to scale. Further, it is not intended that any of the appended claims or claim elements invoke 35 U.S.C. § 112(f) unless the words "means for" or "step for" are used in the particular claim. The present disclosure should in no way be limited to the exemplary embodiment or numerical dimensions if any illustrated in the drawings and described herein.

We claim:

1. A tensioner comprising:
   a base having a shaft and having a radially projecting tab therefrom;
   a pivot arm pivotally engaged with the shaft about a pivot axis A-A;
   a torsion spring disposed between the base and the pivot arm, the torsion spring in a compressed state;
   a pulley journalled to the pivot arm;
   a first axial member extending from the pivot arm, the first axial member comprising a radially projecting portion adjacent to a radially receding portion; and
   the radially projecting portion engaging the radially projecting tab in a first pivot arm position and the radially receding portion cooperating with the radially projecting tab in a second pivot arm position; and
   a retaining member having a clip engaged with the shaft to retain the pivot arm on the shaft against a torsion spring force.

2. The tensioner as in claim 1, wherein a pivot arm movement from the first pivot arm position to the second pivot arm position is in an axial direction.

3. The tensioner as in claim 2, wherein the torsion spring is compressed by movement of the pivot arm from the first pivot arm position to the second pivot arm position.

4. The tensioner as in claim 1 further comprising a bushing disposed between the shaft and pivot arm.

5. The tensioner as in claim 1, wherein the first axial member extends in an axial direction parallel to the shaft.

6. The tensioner as in claim 1, wherein the pivot arm pivot axis A-A is offset and parallel to a pulley rotational axis B-B.

7. A tensioner comprising:
a base having a shaft and having a base projecting portion;
a pivot arm pivotally engaged with the shaft about a pivot axis A-A;
a torsion spring disposed between the base and the pivot arm, the torsion spring in a compressed state;
a pulley journalled to the pivot arm;
an axial member extending from the pivot arm, the axial member comprising a radially projecting portion adjacent to a radially receding portion;
the base projecting portion engaging the radially projecting portion in a first pivot arm position and the radially receding portion cooperating with the base projecting portion in a second pivot arm position, the first pivot arm position is axially displaced from the second pivot arm position; and
a retaining member having a clip engaged with the shaft to retain the pivot arm on the shaft against a torsion spring force.

8. The tensioner as in claim 7, wherein the axial displacement is determined by a fastener.

9. A tensioner comprising:
a base;
a pivot arm pivotally engaged with the base;
a torsion spring disposed between the pivot arm and the base;
the base comprising a base member selectively engagable with a pivot arm member;
the pivot arm member selectively engaged with the base member or disengaged from the base member according to an axial position of the pivot arm; and
a retaining member having a clip engaged with the shaft to retain the pivot arm on the shaft against a torsion spring force.

10. The tensioner as in claim 9, wherein the torsion spring is in compression.

11. The tensioner as in claim 9, wherein a pulley rotation axis B-B is offset from a pivot axis A-A.

12. The tensioner as in claim 9, wherein the base member projects radially from a pivot axis A-A.

13. The tensioner as in claim 9 further comprising a pulley journalled to the pivot arm.

14. The tensioner as in claim 9, wherein the axial position of the pivot arm is determined by a fastener installation position.

* * * * *